United States Patent [19]
Nevo et al.

[11] Patent Number: 5,946,666
[45] Date of Patent: Aug. 31, 1999

[54] MONITORING DEVICE FOR FINANCIAL SECURITIES

[75] Inventors: Igal Nevo, Bala Cynwyd; Maher Salah, Philadelphia; Srinivas S. Dagalur, Philadelphia; Mark Newman, Philadelphia, all of Pa.

[73] Assignee: Albert Einstein Healthcare Network, Philadelphia, Pa.

[21] Appl. No.: 08/652,015

[22] Filed: May 21, 1996

[51] Int. Cl.$^6$ ................................................. G06F 17/60
[52] U.S. Cl. ................................................. 705/36; 705/37
[58] Field of Search ................................. 395/236, 237, 395/239, 201; 340/825.26; 705/36, 37, 39

[56] References Cited

U.S. PATENT DOCUMENTS

| | | | |
|---|---|---|---|
| 4,677,552 | 6/1987 | Sibley et al. | 395/237 |
| 4,796,639 | 1/1989 | Snow et al. | 128/719 |
| 4,834,107 | 5/1989 | Warner | 128/688 |
| 5,161,103 | 11/1992 | Kosaka et al. | 395/236 |
| 5,297,031 | 3/1994 | Gutterman et al. | 395/237 |
| 5,297,032 | 3/1994 | Trojan | 395/237 |
| 5,355,889 | 10/1994 | Nevo et al. | 128/671 |
| 5,608,620 | 3/1997 | Lundgren | 395/201 |

OTHER PUBLICATIONS

Nevo, Igal & Salah, Maher Dislay Content For Operating Room and Intensive Care Unit, The 14th International Symposium on Computing in Anesthesia and Intensive Care, Apr., 1994, Rotterdam Holland.

Nevo, I., Roth, J.V., Ahmed, F. & Guez, A. Vital Function Status: A Parameter to Facilitate Decision Making in Anesthesia, J. Clin. Mon. 7:1, Jan., 1991, pp. 124–125.

Scheke, Th., Rau, G., Popp, H.J., Kasmacher, H. Kalff, G. Zimmermann & H.J. A Knowledge–Based Approach to Intelligent Alarms in Anesthesia, IEEE Engineering in Medicine and Biology, Dec., 1991, pp. 38–44.

Guez, A. & Nevo, I. Neural Networks and Fuzzy Logic in Clinical Laboratory Computing with Application to Integrated Monitoring, Clinica Chimica Acta 248 1996, pp. 73–90.

Nevo, I., Guez, A., Ahmed, F. & Roth, J.V. System Theoretic Approach to Medical Diagnosis, Computer–Based Medical Systems: Fourth Annual IEEE Symposium, 1991, pp. 94–96.

van der Aa, J., Beneken, J., van Oostrom, & J.H. & Gravenstein, J.S., Intraoperative Information Transfer: A Summary Display of Patient Status, J. Clin. Mon. 8:2, 1992, pp. 153–154.

Nevo et al., A New Patient's Status Indicator to Facilitate Decision Making In Anesthesia, Computer–Based Medical Systems, Fourth Annual IEEE Symposium, 1991, pp. 88–93.

Matsiras, P.V., PONI: An Intelligent Alarm System for Respiratory and Circulatory Management in the Operating Rooms, Jun., 1989, pp. 123–137.

van der Aa et al., J. Integration Concepts for Anesthesia Workstation Displays, J. Clin. Mon. 8:2, 1992, pp. 151–152.

Ahmed et al., Anesthesioligist's Adaptive Asscoiate, IEEE–EMBS, Philadelphia, 1990, pp. 49–50.

Nevo et al., Vital Function Status—A Parameter to Facilitate Decision Making in Anesthesia, Orlando, 1991.

*Primary Examiner*—Frantzy Poinvil
*Attorney, Agent, or Firm*—John S. Child, Jr.; Mitchell R. Brustein; Dann, Dorfman, Herrell and Skillman

[57] ABSTRACT

An apparatus and method for monitoring financial securities markets or financial securities to provide information regarding the status of the financial securities markets or securities. The apparatus transforms measured values of more than one parameter of the system using a function dependent on at least baseline and critical values of the parameters. In a preferred form, the function is a sigmoid function. The apparatus further maps the function to a sequence of reference values and generating a deviation indicator for each parameter. The deviation indicators are then analyzed to generate and display information concerning the status of the financial securities markets or financial securities.

76 Claims, 5 Drawing Sheets

MONITORING DEVICE FOR FINANCIAL SECURITIES

FIELD OF THE INVENTION

The present invention relates generally to methods and related apparatus for monitoring and analyzing changes and fluctuations in financial and commercial enterprises. More particularly, the present invention relates to a system for the monitoring and subsequent analysis of financial securities so as to provide a basis for future investment or divestiture.

BACKGROUND OF THE INVENTION

Today there is a plethora of computer software programs which allow for the collection, organization and analysis of data from many different sources and fields of study. Financial institutions in particular rely heavily on computer systems and programs to run the myriad of investment options and strategies for their clients and depositors. The current school of thought encourages the investment of one savings into financial opportunities other than the traditional savings account. The stock market in general has out-performed and provided greater rates of return for money invested than savings accounts over the last 15–20 years.

Investment in these types of securities however always carries risk be it through the direct purchase of a company's stock listed on one of the many markets or through the purchase of mutual funds and/or money market shares. Prudent investment in these areas requires the ability to analyze carefully how a company or financial market has performed in the past and its expectations for the future. In this manner one can hope to forecast what a financial security such as a company's stock or a financial securities market will do in order to purchase financial securities or focus on financial securities markets that will go up in value and provide the greatest rate of return.

Unfortunately, even after careful analysis the ability to project the future activity and performance of a financial security or financial market is never a sure thing and the investor can only hope these expectations will come to fruition. Nevertheless, many financial planners and creators of investment portfolios try to project the future performance of financial securities and financial security markets with varying results. It would be highly advantageous then, if one could monitor a financial market or financial security and analyze the vast amount of data collected therefrom using indicators that would be helpful to an analyst or that analysts employ in trying to project the future performance of that market or security.

Computer systems for monitoring and analyzing data from physiological and physical sources are known in the art. Seismographs for example, are well known sensors for the detection of tremors below the earth's crust and this data can be used to predict when and where an earthquake will occur.

U.S. Pat. No. 4,796,639 to Snow et al. discloses and claims a pulmonary diagnostic system in which a computer records and stores lung physiology data and compares recorded values with expected norms. Based on the comparison, the computer generates certain values (if so recorded) as abnormal and the degree of abnormality as a function of a baseline. This can then be used to immediately sense and/or predict pulmonary problems or early signs thereof for preventive treatment.

U.S. Pat. No. 4,834,107 to Warner discloses and claims a non-invasive method for determining heart-related parameters in patients. The apparatus measures a number of physiological changes such as pulse pressure, peripheral resistance, systolic and diastolic pressure, cardiac output and the like. These are then fed into a number of mathematical formulae which when computed as a function is indicative of the state of the system and when that system falls outside the healthy norm. This can then be used to predict the likelihood of future problems in the patient.

U.S. Pat. No. 5,355,889 to Nevo et al. discloses a patient monitoring system which collects and analyzes a plurality of different medical parameters derived from a human subject. Particularly useful in the monitoring of the bodily functions of a patient under anesthesia during surgery, the system monitors the physiological parameters and transforms them into a sigmoid function indicative of normal and critical levels of that physiological parameter. A comparison of maximum and minimum function values with a baseline value produces a vital function status indicator which not only provides a reasonable assessment of the patient's condition, but also what parameter(s), if any, are responsible for a patient's deteriorating condition.

U.S. Pat. No. 5,465,308 to Hutcheson et al. discloses and claims a pattern recognition system comprised of a software program and method for its use which utilizes a neural network implementation to recognize the similarity of information received compared to that stored in a database. Two dimensional images are subjected to Fourier Transformation to yield a power spectrum. From this spectrum, output vectors are generated which are statistically analyzed to determine any correlations between known patterns of data stored and that coming in. Whereas the main function is the matching of facial patterns, other applications are allegedly possible.

The above-described systems provide a basic means for the monitoring of multiple parameters either for the diagnosis of and solution to a problem or for the evaluation of the condition of an entity which, through analysis, reasonably would give one a well founded basis to anticipate possible future changes. Many other such systems in control applications exist in the art but none provide the ability to monitor a number of parameters which can be transformed into a single indicator for use in projecting performance of specific financial securities or financial securities markets.

U.S. patent application Ser. No. 08/647,396, which is a companion application to the present application by the same inventor, discloses an apparatus and method for monitoring a system, such as a patient, to provide information regarding the status of the system. The use of a system criticality indicator to convey information about the overall status of the system is described. The system criticality indicator ($DI_{cri}$) is defined as:

$$DI_{cri} = \frac{n_m}{n}(DI_{max} - DI_{avg}) + DI_{avg}$$

wherein n is the total number of parameters being measured, $DI_{max}$ is the maximum deviation indicator for all of the measured parameters, $n_m$ is the total number of parameters with a deviation indicator equal to the maximum deviation indicator, and $DI_{avg}$ is the average of the deviation indicators for each measured parameter.

In light of the above, it would be advantageous to provide an apparatus and method for monitoring a security or financial market wherein an overwhelmingly large amount of data is consolidated to provide the user with a manageable amount of information from which he could better assess the condition of a security or financial market. Preferably, the apparatus and method is responsive to the particularities of the user and the specific security or financial market being monitored. In addition, the apparatus and method should be rapid enough to provide information in real-time or at any specified time.

SUMMARY OF THE INVENTION

The present invention is a method and apparatus for use thereby that enables the monitoring and analysis of financial securities markets and related forums. Financial market changes are monitored by the collection and organization of data from multiple parameters for each market segment. Within each segment, the current trading status of a financial securities market or financial security such as a company stock, mutual fund shares and commodities futures, may be deduced and the status used by analysts to project from a number of security index values or parameters which are considered within specified boundaries with respect to a baseline value. In this manner, the system can monitor multiple data elements either horizontally, i.e., same parameters for different financial securities or vertically, different elements within the same security making up a financial securities market.

The status indicator is then presented to the user in a form which conveniently conveys information about significant changes contributing to the condition of a security or financial market. Based on the indicator, the user can take appropriate action concerning investments in the security or financial markets.

BRIEF DESCRIPTION OF THE DRAWINGS

The foregoing summary, as well as the following detailed description of the preferred embodiments of the present invention, will be better understood when read in conjunction with the accompanying drawings, in which.

DETAILED DESCRIPTION OF THE INVENTION

Figure 1:
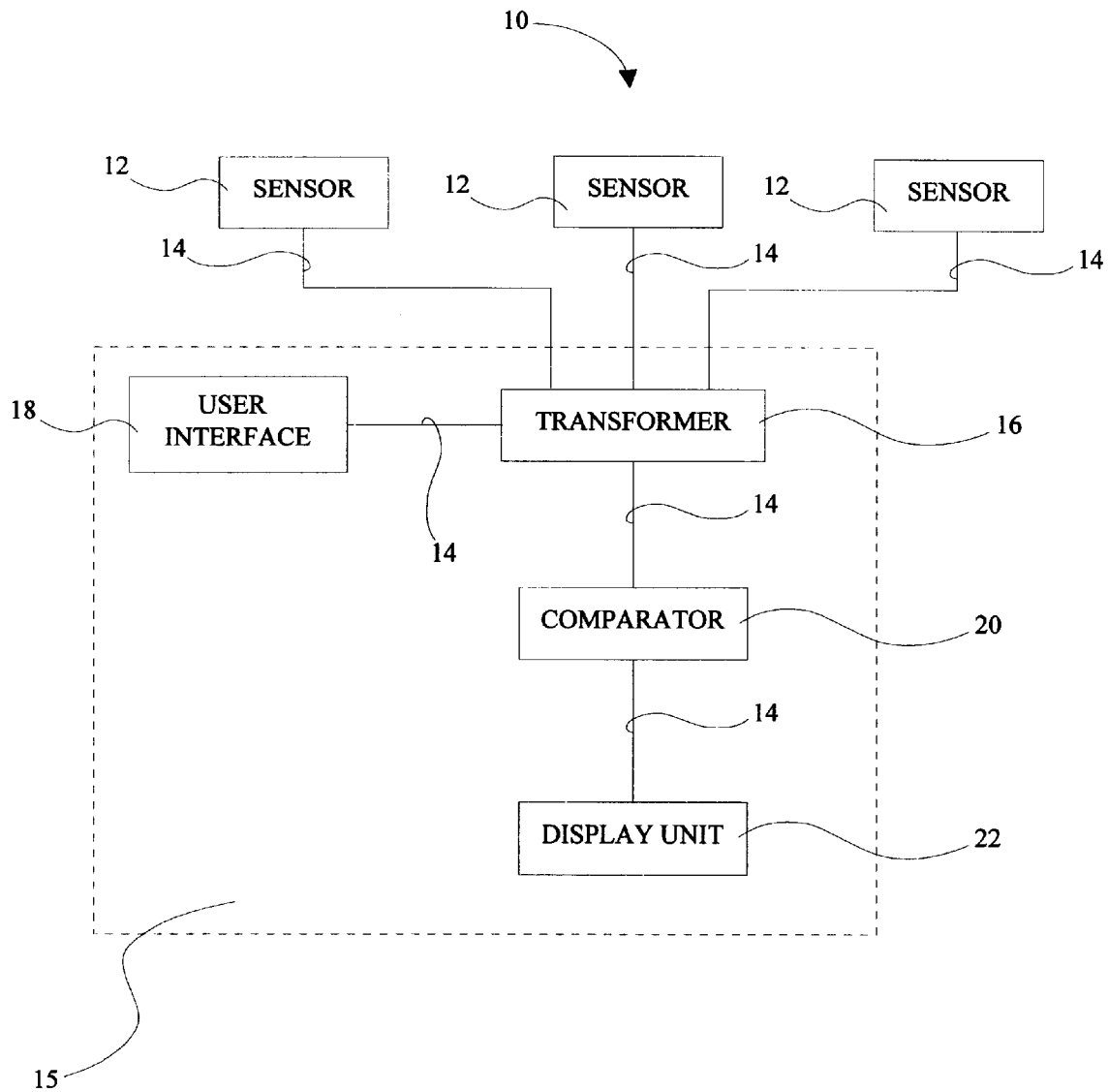
FIG. 1 is a schematic representation of an apparatus for monitoring a system in accordance with the present invention.

It has been determined that there is a specific reciprocal relationship between the entire financial market, a specific market segment (e.g., blue chip, utilities) and the individual company. This relationship is not always linear and/or in the same direction. In a stock market, for example, one company may thrive notwithstanding an overall downturn in the market as a whole.

The security index values that provide the basis for monitoring a particular stock or mutual fund and allow for the projected performance thereof are those generally reported in the financial sections of major newspapers and business journals. Preferably, the stock index value will be one from the New York Stock Exchange ("NYSE"), the American Stock Exchange, the NASDAQ National market or the Mutual Funds Listings. Foreign stock exchanges, currency exchanges, stock futures, precious metals, the bond market and other securities could also be monitored using the method and system of the present invention but the aforementioned four stock exchanges or financial securities markets are the most well known measures of corporate viability.

If the security of interest is an issue of common stock from the New York Stock Exchange, the security index values monitored may be, but are not limited to, one or a number of the following:

1) dividend values, defined as the annual rate of the monetary value of the cash dividend based upon the last payment;

2) the yield, which is the annual dividend rate, expressed as a percentage of the closing price;

3) the price to earnings ratio (P/E) which measures the value of the share price divided by the earnings per share;

4) the sales volume index which shows the number of shares of stock traded during the previous day; and 5) the Hi-Lo values given are for the highest and lowest stock prices traded that day.

6) the dividend index for each listing which reports the annual rate of cash payment made to shareholders based on the last dividend; and 7) the sales volume which indicates the number of shares sold or traded the previous trading day.

The last referenced value for any security index or financial market, may be used as a reference to generate a deviation indicator which represents the level of deviation associated with the last referenced value.

The method for calculating the status values of a stock on the American Stock Exchange, is much the same as those reported for each daily trading period on the NYSE. These values can be analyzed and used as individual values or any number of them can be transformed to a number of deviation indicators thus giving a broader, better picture of the present and expected performance of the stock.

These stock index values may be monitored and performance analyzed over a wide variety of time periods such as shorter periods of seconds, minutes, hours, or days to longer periods of a year or more. Obviously, the longer a period is monitored the more reliable the analysis should be.

A particular mutual fund's performance can also be monitored using the method of the present invention. A group of funds can be analyzed simultaneously as well. Useful fund indices that can be substituted into the equation may include the expense ratio which is the percentage of the fund's average net assets that are spent on operating expenses or costs. Another stock index is the net asset value (NAV) which indicates the value of securities and cash in the fund divided by the number of shares in the fund. A third and perhaps most important index to monitor is the daily change in net asset value of the fund reported from one day to the next.

Types of financial securities can be analyzed and future performance projected based upon the type of security involved. Blue chip funds can be compared with the performance of bond funds or utilities stocks. Science and technology portfolios can be analyzed with regard to expected performance versus small cap funds and/or pharmaceutical stocks. The variety of analysis that can be carried out using the method of the present invention is limitless providing that each security index is transformed and compared to the prescribed sequence of reference values as set forth below. Under such conditions, the analysis can be carried out in a consistently accurate and timely fashion. This capacity for accurate and rapid analysis assists the user in evaluating future financial performance of the stock market.

The security index values or financial parameters (the terms will be used interchangeably herein) which may serve as the studied parameters include, but are not limited to:

1) Current trade value (for the specific stock, commodity futures, currencies, etc.);
2) Volume of shares traded (for the specific company);
3) Stock market indices, such as Dow-Jones, NASDAQ Composite, S&P 500, which are provided (for the entire stock market, and for the specific market segment). Each index reflects an aggregate value for a fixed number of companies and reflects the trend of the stock market;
4) Ask value;
5) Bid value;
6) Price/Earnings ratio;
7) Specific (or general) announcements for the market which do not have a monetary or any specific numerical value. They are used as triggers for transactions or flags to understand them;
8) Closing value (for the individual Co.) which is set at the closing of the exchange and is, or may be, used as a reference for the next day's transactions;
9) Opening value (for the individual Co.) which is set at the opening of the exchange and is, or may be, used as a reference for the same day's transactions;
10) High/low values of trades;
11) Exchange index (e.g., commodities futures, etc.);
12) Total volume of shares traded for the entire market and each security and/or stock;
13) The monetary value of all the stocks traded; and
14) Commercial performance of the individual stock. These include a (large) set of data (i.e., sales, earnings).

According to the present invention, the individually measured financial parameters are transformed to normalized data that can be used by the system to generate the security's performance indicator (SPI). In addition, the transformation is relatively simple to carry out.

Thus, the security performance indicator (SPI) can be calculated on-line, in real time. Further, the transformation can be carried out depending upon the focus of the particular analyst.

Referring now to FIG. 1, a system 10 for monitoring a financial market in accordance with the present invention is shown schematically. The system 10 comprises three sensors operatively connected to the system for measuring the values of three separate parameters associated with that system. However, the number and types of sensors 12 used will vary, depending upon the specific application.

Accordingly, the sensors 12 can comprise physical sensors or logical sensors, such as monitors, for measuring the values of a plurality of parameters associated with the system of interest. The sensor may be a component of a remote sensing station. Accordingly, the sensor can supply measured values to the remote sensing station in either a continuous mode or on demand. Further, the sensor or the remote sensing station may be provided with data storage means, such as a computer readable disk, for storing the values measured by the sensor so that the values can be processed at a later time.

The measured values of the parameters are then transferred to a processor 15 across one or more signal lines 14. In one embodiment, the monitors 12 are interfaced to the processor 15 using a data communication link. The processor 15 can comprise a single stand-alone unit or it can be linked to a network using client/server architecture. In one embodiment, the processor 15 comprises a PC Pentium desktop platform using UNIX or Windows NT operating system. Further, the processor 15 is developed as an object oriented implementation in the C++ language. The processor 15 uses an Ethernet Network card and runs TCP/IP communication protocol. Cables or wireless communication devices are used for the network connectivity.

The processor 15 optionally comprises a user interface 18 for transferring a system profile to the transformer 16 across a signal line 14. Preferably, the user interface 18 is in the form of a computer keyboard so that the user can directly input information to the transformer 16. Accordingly, the user interface 18 can be developed using an OSF/MOTIF Toolkit. Alternatively, the system profile can be stored in a form which can be accessed by the transformer 16. The system profile supplied to the transformer 16 comprises information about the baseline, minimum, and maximum values of each of the parameters. Identifying information about a system (i.e., system type, user's name, identification number, time, date, etc.) can also be provided.

The processor 15 also comprises a transformer 16 which takes the measured values of each financial parameter and generates a deviation indicator for each parameter. The transformer 16 assigns to each financial parameter a deviation indicator which represents the level of performance associated with the parameter. In one embodiment, each financial parameter is assigned one of six levels of performance, ranging from zero to five according to the following scale:

0—(color of display background) No deviation from baseline
1—(white-yellow) Little movement from baseline
2—(yellow) Some deviation from baseline
3—(orange-yellow) Greater deviation from baseline
4—(orange) Considerable deviation from baseline
5—(red) Maximum deviation from baseline Accordingly, the transformer maps each parameter into numbers representing the state of each parameter relative to the system's baseline conditions and to prescribed maximum and minimum reference values for each parameter.

The individual deviation indicators are then transferred across a signal line 14 to a comparator 20. The comparator 20 compares the values of the deviation indicators to one another and generates one or more status indicators. The status indicators contain information regarding the overall status of the financial security system of interest.

A display unit 22 is provided for communicating the financial status indicators to the user. The display unit 22 is connected to the comparator 20 by a signal line 14 which allows the status indicators to be passed from the comparator 20 to the display unit 22. Preferably, the display unit 22 comprises a video monitor so that the financial status indicators can be visually displayed in a form that is easily analyzed by the user. Optionally, an audio-signal indicator is also generated that has different sounds for each level of deviation.

Figure 2:
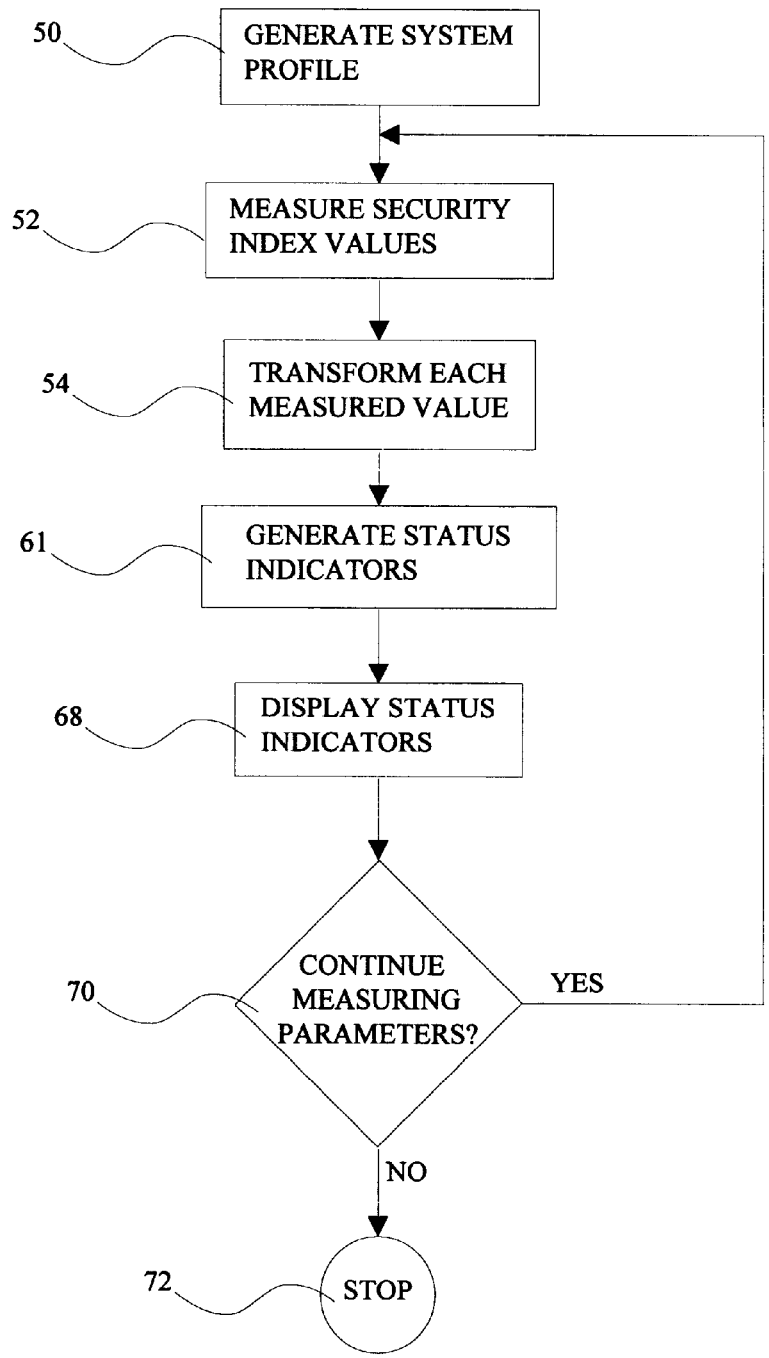
FIG. 2 is a flow chart showing the steps involved in a method for monitoring a system in accordance with the present invention.

The present invention also relates to a method for monitoring a financial security or financial securities market as depicted in FIG. 2. According to the method, a security index value profile is generated at step 50. The user is given an option of either creating a new security index value profile or recalling an old one. If a new profile is to be created, the user inputs the information regarding the security index profile for the financial securities or financial securities markets to be monitored. For many applications, such information includes a baseline, a minimum, and a maximum value for each security index value. If, however, an old index profile is to be used, the user is preferably given an option to adjust the existing security index profile. The method of the present invention allows the user to tailor the index profile to the individual characteristics of the security index value to be analyzed.

Once the security index profile has been generated, the individual security index values are measured, as shown at step 52. The number of security index values measured will vary from application to application. However, the method of the present invention is completely applicable to the measurement of any number of security index values.

At step 54 the measured value of each security index value or parameter is transformed to yield a deviation indicator for each financial parameter. The measured values are mapped into a corresponding deviation indicator using a transformation function. In a preferred form the function is asymmetric about the financial baseline value. In one embodiment, the transformation is a function which exhibits a maximum sensitivity for deviations close to the baseline value of the parameter, such as a sigmoid function. However, the present invention can also be practiced using transformation functions which exhibit a minimum sensitivity for deviations close to the baseline value of the parameter.

Figure 3:
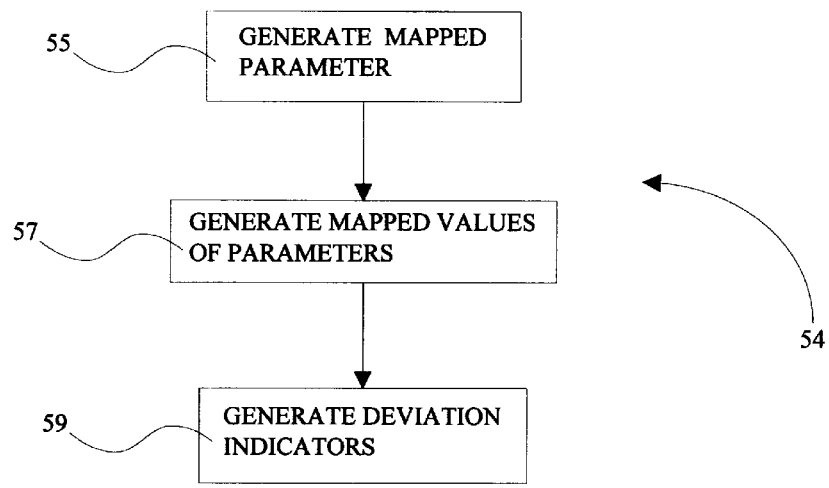
FIG. 3 is a flow chart showing the steps involved in transformation step 54 of FIG. 2.

The process for transforming each measured value into a deviation indicator, step 54, is shown in greater detail in FIG. 3. A mapped parameter is generated for each financial parameter at step 55. The form of the mapped parameter is determined by the function used to effectuate the transformation. The mapped parameter reflects the information regarding each parameter which was generated as part of the system profile at step 50. Preferably, the mapped parameter is different for values of the parameter above the financial baseline value and below the baseline value.

Once the value of the mapped parameter has been determined, the mapped value of the parameter is generated at step 57. The mapped value is generated using the transformation function and the appropriate value for the mapped parameter.

The mapped value of each financial parameter is then used to generate the deviation indicator for each parameter at step 59. The deviation indicator is determined by assigning to each parameter a level of deviation associated with the parameter. Preferably, the higher the mapped value, the higher the level of deviation. As stated before, each mapped value is preferably assigned one of six levels of performance, ranging from zero to five according to the following scale:

0—(color of display background) No deviation from baseline
1—(white-yellow) Little movement from baseline
2—(yellow) Some deviation from baseline
3—(orange-yellow) Greater deviation from baseline
4—(orange) Considerable deviation from baseline
5—(red) Maximum deviation from baseline In one particular embodiment, the transformation is based on the well known sigmoid function. Baseline values that may be used for the purpose of this invention include, but are not limited to, the security's closing price, the security's opening price, its year to date average price, its year to date high and/or low price, etc. The security analyst is free to select any baseline value of interest. This baseline value can be received directly from the financial market or from hardware storage media. Alternatively, the baseline value can be directly entered by the operator. However, the transformation is identically performed for all parameters; only the baseline and maximum and minimum values are changed.

The financial analysts are given the option to either create a new stock profile or to recall an old one. To apply the function, there is a need to use three parameters; the baseline value, the minimum value and the maximum value.

The minimum and maximum values may be set according to the stock's previous day's values. For example, for current traded stock value, the minimum and maximum values utilize the previous day's low and high stock values, respectively. These values may be user defined. Baseline values are mapped to a value of 0.5. When the parameter (e.g., stock value) goes above the baseline value, it is mapped to a value above 0.5 and below 1.0; values below baseline are mapped to values below 0.5 and above 0.0.

Thus, the transformation maps the parameter or stock index value (parameter and stock index value are used interchangeably) of the stock into numbers representing the state of each parameter relative to the stock's condition and to prescribed maximum, minimum, and baseline reference values for each parameter.

The basic equation for the sigmoid function employed in this embodiment is as follows:

$$f(x) = \frac{1}{1 + e^{-G(x-BL)}}$$

where BL is the baseline value for parameter x of the stock of interest x for which the function f(x) is equal to 0.5 when x=BL (in general, it is preferable to choose the midrange of the sigmoid function as the baseline). The parameter G is determined on the basis of the desired value of f(x) for some other value of x. G is determined with the equation:

$$G = \frac{-\ln\left(\frac{1}{f(x)} - 1\right)}{(x - BL)}$$

According to one embodiment of the present invention, the value of G for all functional values below baseline and the value of G for all functional values above the baseline are derived by setting x equal to its minimum and maximum values, respectively, and mapping these values to values for f(x) of 0.1 and 0.9. (There will only be one value of G if the baseline value is centered between the maximum ($x_{max}$) and minimum ($x_{min}$) values). For any parameter x, the maximum and minimum values are typically known. Therefore, given the baseline value BL of any parameter, the following values are determined:

$$G_{low} = \frac{-\ln\left(\frac{1}{0.1} - 1\right)}{(x_{min} - BL)}$$

-continued $$G_{high} = \frac{-\ln\left(\frac{1}{0.9} - 1\right)}{(x_{\max} - BL)}$$

Accordingly, $G_{low}$ and $G_{high}$ may be determined and thereafter used to determine the value of f(x) in real time in accordance with the following equations:

$$f(x) = \frac{1}{1 + e^{-G_{low}(x-BL)}} \text{ for } X \leq BL$$

$$f(x) = \frac{1}{1 + e^{-G_{high}(x-BL)}} \text{ for } X > BL$$

A similar transformation may be performed upon every parameter measured by the system, since there is a corresponding value of $G_{low}$, $G_{high}$ and BL for every parameter.

The values of f(x) for each parameter x is then used to generate the deviation indicator for each parameter using an equation of the form:

$$DI = \lfloor K \times Abs(y - 0.5) \rfloor$$

wherein DI represents the deviation indicator, Abs represents absolute values, K represents a constant, y represents the value of the function, and "⌊ ⌋" represents a floor function that returns the largest integer value of an expression contained between the "⌊" and the "⌋" symbols.

The use of the sigmoid function as described above provides several advantages. First, the transformation provides maximum sensitivity (or gain) for parameter values (x) near the parameter's baseline value. Therefore, the value of f(x) will change most rapidly when the measured value of parameter x first begins to move away from the baseline value and will change least rapidly when the value of the parameter is far away from its baseline value. In addition, the data needed to calculate or recalculate the transformed data can be easily and quickly determined. The system may advantageously be programmed such that the baseline profile data may be modified on line. In this case, the system will be adaptable to any financial market, taking into account the market's current environment, and the particular stock involved. The maximum and minimum values could also be modified on line.

In another embodiment, the equation used to transform the measured values of the indices to the deviation indicators is of the following form:

$$y = \tfrac{1}{2}\{1 - \exp(-G(x-BL)^2)\},$$

wherein y represents the value of the function, x represents the measured value of the parameter, BL represents the baseline value for the parameter, and G represents the mapping parameter.

The mapping parameter, G, is determined by solving the above equation. Accordingly, the mapping parameter is given by an equation of the form:

$$G = \frac{-\ln(1 - 2y)}{(x - BL)^2}.$$

The mapping parameter, G, is then solved for two ranges of the parameter, x. The first range corresponds to values of x when x<BL and the second range corresponds to values of x when x≧BL. Alternatively, the first range corresponds to values of x when x≦BL and the second range corresponds to values of x when x>BL. Accordingly, the two values of the mapping parameter corresponding to the two ranges are given by the following equations:

$$G_{low} = \frac{-\ln(1 - 2y')}{(x_{\min} - BL)^2}$$

and $$G_{high} = \frac{-\ln(1 - 2y'')}{(x_{\max} - BL)^2}$$

wherein y' represents the value of the function at $x_{min}$, $x_{min}$ represents the minimum value of the parameter, y" represents the value of the function at $x_{max}$, and $x_{max}$ represents the maximum value of the parameter.

Once the values of the mapping parameter, G, for the two ranges have been determined, the mapped value of the parameter is generated using an equation of the form:

$$y = \tfrac{1}{2}\{1 - \exp(-G_{low}(x-BL)^2)\}, \text{ for } x < BL$$

$$\tfrac{1}{2}\{1 - \exp(-G_{high}(x-BL)^2)\}, \text{ for } x \geq BL$$

For each parameter, the measured value of the parameter, x, is plugged into the above equation, along with the appropriate baseline value, BL, and mapping parameter, G. Accordingly, a mapped value of each parameter, y, is generated.

The mapped value of each parameter, y, is then used to generate the deviation indicator for each parameter using an equation of the form:

$$DI = \lfloor K \times y \rfloor$$

wherein DI represents the deviation indicator, K represents a constant, y represents the value of the function, and "⌊ ⌋" represents a floor function that returns the largest integer value of an expression contained between the "⌊" and the "⌋" symbols.

Returning to FIG. 2, once the deviation indicators have been determined for each parameter, the deviation indicators are analyzed to generate one or more performance or status indicators at step 61. The status indicators contain information about the overall status of the system. The performance indicator is a scalar or bar indicator that signifies the relative volatility of the stock at issue in terms of its deviation from the overall group's baseline. In a preferred embodiment of the invention, the stock's performance indicator is assigned one of six values, ranging from zero to five. Zero represents stability and five represents either a loss and downward performance or a positive gain and upward performance. On the display, the area representing each performance level increases as the level gets further from the baseline (i.e., the gain or sensitivity of the transformation decreases as the measured parameter moves away from its baseline level). The transformation is performed on every parameter, therefore there is an assigned level for each parameter.

The value of the security performance indicator is taken to be the maximum level of the transformed parameters be this in terms of negative deviation or positive deviation. The performance indicator is assigned a performance or value level by comparing the indicator to prescribed reference values. Exemplary reference values are shown in the following table.

0—(color of display background) No deviation from baseline

1—(white-yellow) Little movement from baseline

2—(yellow) Some deviation from baseline
3—(orange-yellow) Greater deviation from baseline
4—(orange) Considerable deviation from baseline
5—(red) Maximum deviation from baseline The above reference values may be adjusted to meet the specific parameters and analysis thereof for each financial security and financial securities market.

Another feature of one system in accordance with the present invention is that one or more subsystems can be defined wherein the measured security index values or parameters are grouped according to subsystems. As an example, a bad profit/earnings quarter frequently affects the value of a given company's stock and may result in a reduction in the stock dividend thereby affecting the stock yield.

Figure 4:
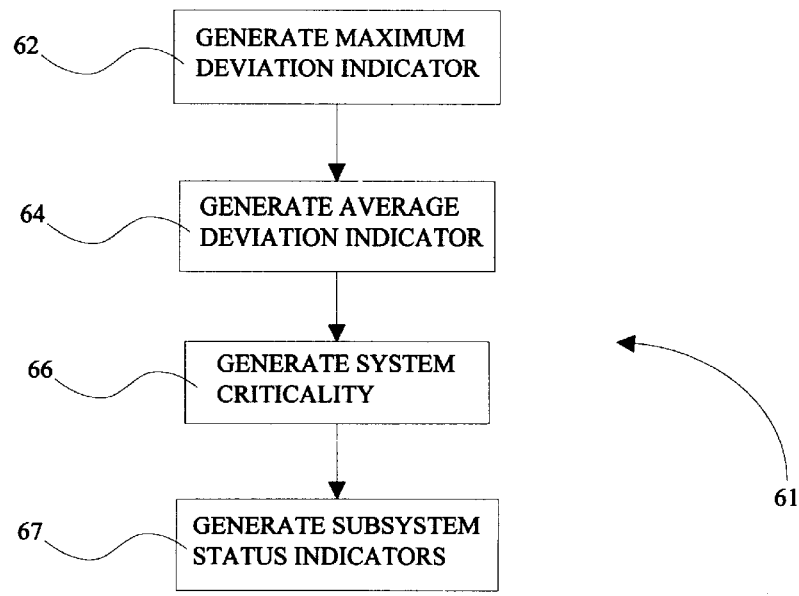
FIG. 4 is a flow chart showing the steps involved in comparison step 61 of FIG. 2.

In some applications, the same security index value or parameter can be grouped in more than one subsystem. One or more subsystem performance or status indicators associated with each subsystem are then generated at step 67 of FIG. 4 by analyzing the deviation indicators for the measured parameters which are grouped in each subsystem. The subsystem performance indicator becomes the largest deviation indicator of all the parameters grouped in that subsystem. For example, the dividend yields of 10 companies (numbers 1–10) may be monitored. Of those companies, numbers 1 and 4–7 may all be related to the same parent company and can therefore be grouped as a first subsystem. Similarly, numbers 1, 3, and 8–10 may relate to the same parent company and be grouped as a second subsystem. If the deviation indicators corresponding to the dividend yields of companies 1, 3 and 8–10 have a value of "1," and the deviation indicators corresponding to the dividend yields of companies 4–6 have a value of "2," the performance indicator of the system will be assigned "2." Additionally, the subsystem comprising the first group of companies will be assigned a subsystem performance indicator of "2" and the subsystem comprising the second group of companies will be assigned a subsystem performance indicator of "1."

The security performance indicator may be displayed along with an indication of the subsystems involved. Each of the subsystem, however, will be represented with its subsystem status or performance indicator, respectively "2" and "1." The advantage of this is that it minimizes the null space and eliminates ambiguity.

The true scope of the present invention is not limited to the transformation of the measured parameters to values ranging from zero to one, nor is the invention limited to the partition of the transform space into six value levels. Indeed, the invention may be carried out using a transformation other than the sigmoid transformation described herein (although the sigmoid is one presently preferred function). As indicated above, an advantageous feature of the sigmoid transform is that the transformed parameters can be directly compared with one another in determining the security performance indicator. Other important features of the sigmoid transform are that it has a maximum sensitivity (gain or slope) for parameter values near baseline and that it can be defined with only three variables ($G_{low}$, $G_{high}$, and BL), which can be memorized by the system and employed to transform the measured data in real time using relatively simple formulas. In addition, the sigmoid transform may be applied in a different manner (using a different value of G) for parameter values below and above the baseline value, which is advantageous in transforming parameters that may have baseline values skewed closer to the minimum value than to the maximum value, or vice versa. Any transformation with these or similar features may be employed in practicing the present invention.

Instead of the sigmoid function specified above, the measured financial parameters may be normalized by utilizing other functions, such as:

$$y = \frac{1}{1 + e^{-G(x-BL)}}$$

$$y = \tanh(x)$$

$$y = \frac{x}{(1 + x)}$$

$$y = ax + b\sin w \quad |x| > |bw|$$

$$y_m \quad x > x_{max}$$

wherein x represents the monetary value of the particular security index; BL represents the baseline monetary value for the securities index; $X_{max}$ represents a predefined maximum value for the security index; a, b, and w represent predefined numbers; and y represents the value of the function, an $y_m$ represents a predefined maximum value of the function.

Following the method of the present invention, the user can analyze changes in a financial market that are publicly known (i.e., reported in the news) or of personal knowledge alone (i.e., confidential information). The user can also perform vertical or in depth analysis of financial securities of a specific company or financial securities market segment. The data can be received on-line directly from the financial market being studied.

Figure 5:
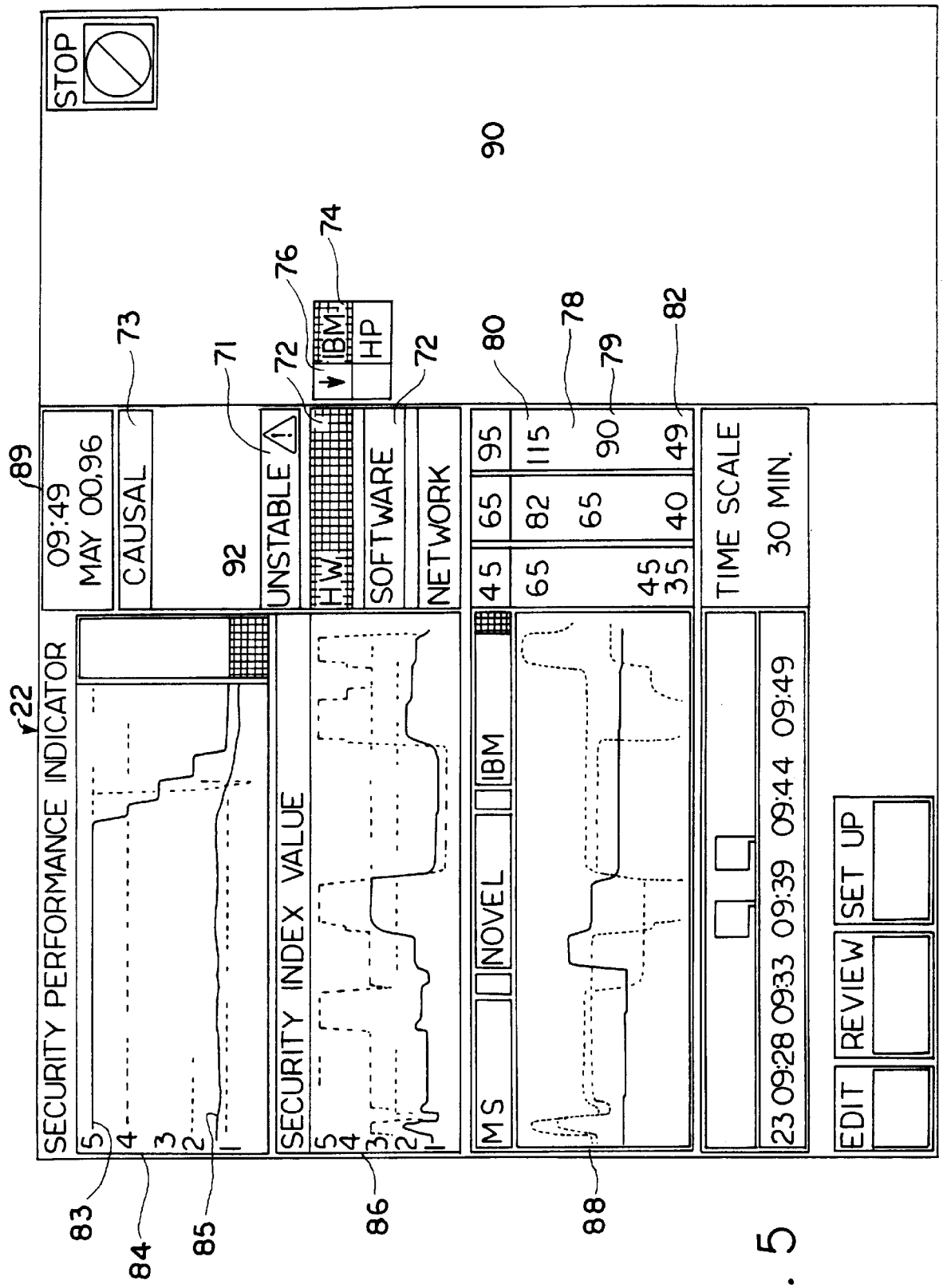
FIG. 5 is a view of a display in accordance with the present invention for monitoring any one of a number of financial securities indices indicating the performance of the group of securities of interest.

Referring now to FIG. 5, the data received is processed within the on-line computer and displayed upon a video screen (22). The main screen (89) provides a horizontal information and data display (72, 84, 86, 88, and 92) for all the companies that the user focuses on. The display at the top screen (84) contains general information about the current state of the market, (e.g., security's performance indicator (83) and an average security performance indicator (85)). Adjacent to each stock market segment shown by the icon (72) is a space or window indicating the initials of the stock or security whose performance is being monitored (74). The stock abbreviation indicates that the company monitored is on the display. Clicking on another icon (72) will reveal other stocks whose performance is being monitored within a different market or group segment.

Adjacent to the window (74) there is a space for an arrow indicating up or down (76). An upwards arrow indicates an increase in the value of the stock and conversely a down arrow indicates a decrease in the value of stock. The current value of the stock is displayed as a number (not shown) that inherits one of the following six colors: color of display background, white-yellow, yellow, orange-yellow, orange and red representing the trading activity of at least one stock.

0—(color of display background) No deviation from baseline
1—(white-yellow) Little movement from baseline
2—(yellow) Some deviation from baseline
3—(orange-yellow) Greater deviation from baseline
4—(orange) Consideration deviation from baseline
5—(red) Maximum deviation from baseline Next to the market value, there is an indication (not shown) of the difference between the current stock value and the closing value. This difference is also in numbers and also inherits the color of the current trade value.

The difference between the current stock value and the closing value can be, for example, a number 1/64 of $1.00. From this it is obvious that a small change of a low value stock may be more significant than a larger difference of a stock with a higher value.

The system provides a global indicator (specific performance indicator) for the entire group of stocks and reflects the individual changes of each stock and the direction of change. All these changes are indicated, using the 0–5 integer scale that indicates the maximum deviation of the entire group. The system also indicates the average deviation of the entire group using the continuous value on the 0–5 absolute value integer scale. This eliminates the virtual null space created by displaying the maximum deviation only. The security index values are revealed upon request by the financial analyst. The reference values use the previous day's closing value as the baseline value.

The baseline value (79) may be displayed. For the purpose of analysis of current rates of the entire group, all stock market quotations are analyzed using specific data elements. These security index values will be the same for all the stock market quotations (horizontal analysis). These values will include current trade value, volume of the stocks traded for each quotation, ask and bid values (other values may be included at a later stage). The high (80) and low (82) boundaries or critical values may also be displayed respectively, on the screen (78) and these high and low critical values may be changed at the analyst's will. The values shown on the screen (78) comprise the current referenced values and baseline.

The system receives data on-line from the stock exchange floor, or from any other on-line service. It is clear that the rate of update may be different contingent upon the rate of transmission of the service provider.

Referring again to FIG. 5, the display provides a zoom-in to different time intervals: 15 minutes, 30 minutes, 1 hour, etc., up to one week or one quarter year. Comments and events are entered using the keyboard. For purposes of analyzing one company, the system will provide access to the data base without losing the contact or the view of the SPI and average SPI indicators. As noted below, the system will provide a comparable display of the Dow Jones, NASDAQ, etc. either on the same window or on a separate window underneath the current window.

The main display (89) is divided into two main portions. On the right is an empty space (90) for interaction with the system while, the left section is the main information display (72, 84, 86, 88, and 92). The main subsection will include three windows. The top window (84) includes the trend SPI and the average trend SPI indicators for the group of stocks being monitored. The middle window (86) indicates other market indices (e.g., Dow Jones). The lower window (88) allows the user to focus on up to three stocks. In the middle of the screen lateral to the top window is a bar (92) that changes in height and color. The bar (92) reflects instantaneous changes in SPI. There are 6 different colors, one for each value. The bar changes in height according to the maximum deviation and inherits the color that corresponds to that level. This mode of presentation conveys the information in 2 dimensions, height and color. The purpose of the system is to convert the security index values to information that will be perceived and comprehended by the user at a glance.

In the center of the screen lateral to the bar there is a group of push buttons/icons (72) for each subsystem representing certain financial securities or a financial security for a horizontal-type analysis or subsystems for a vertical-type analysis. These indicators assume the color of deviation that corresponds to the maximum deviation of the individual indicators or icons that are included in this market segment or subsystem. The analysis of each segment is independent of all other quotations and with the sigmoid function or other method discussed supra. Above the group of the market segments there are two push buttons/indicators that will reveal the causal event (73) and the "unstable" icon (71). At the bottom of the screen there is a set of utility buttons that allow the user to interact with the system. Clicking on one of the subsystem or market segments push-buttons will reveal the individual icons, the color that indicates the degree of deviation, and an arrow that indicates whether the deviation is increasing or decreasing.

Figure 6:
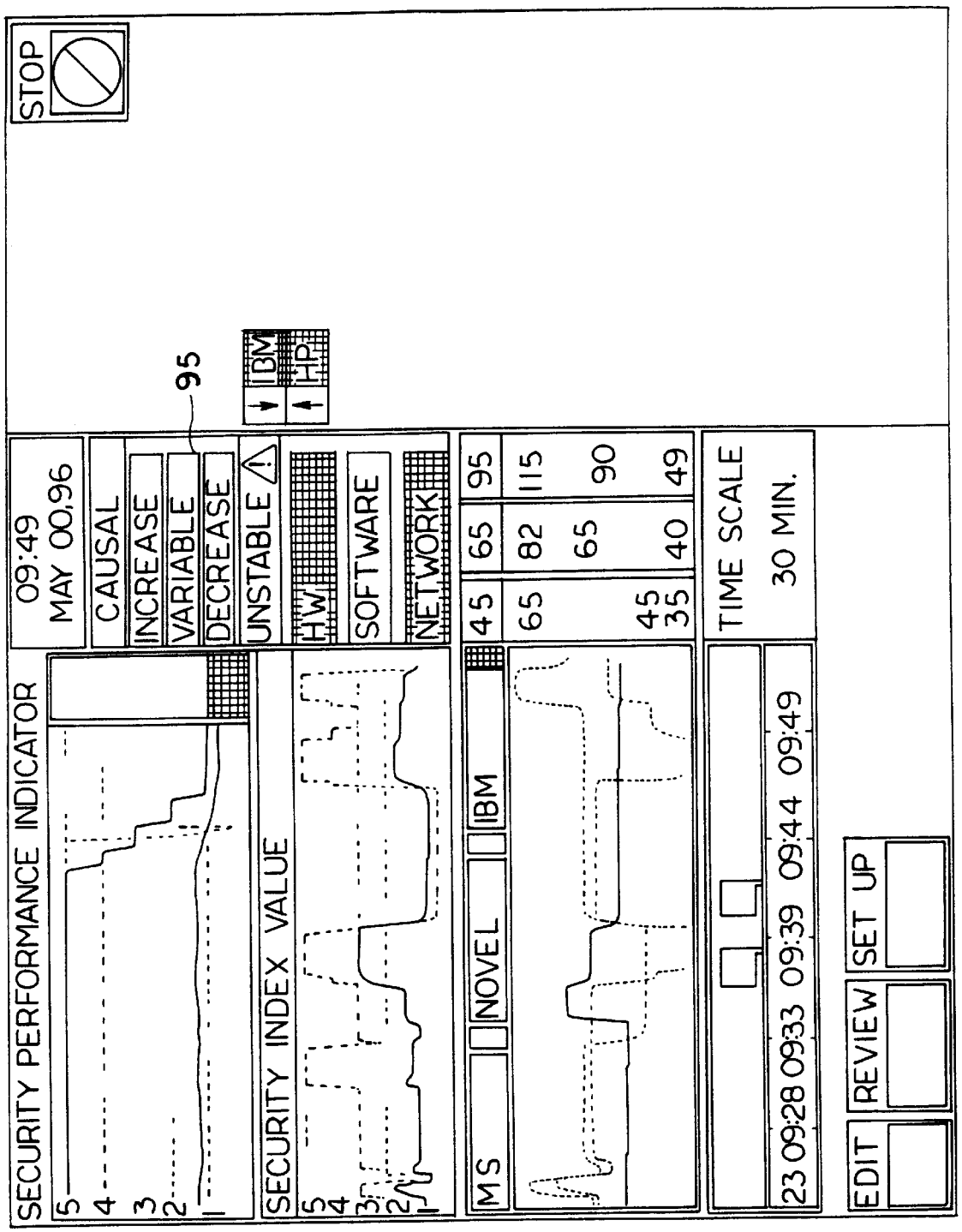
FIG. 6 is a view of the display in FIG. 5 wherein a second group of financial indices is shown indicating the performance of three specific stocks.

In yet a further embodiment of the present invention, in addition to the unstable icon (71), the display can include three push button indicators or icons (95), shown in FIG. 6, which will reveal three additional sets of security parameter index values. A first functional icon when activated will display all the parameters for the securities of interest for those securities that are being traded at values above those sold the previous day, week, month, year, etc. A second functional icon when activated summarizes all the parameters for those securities that are changing or variable for a given point in time. This is tantamount to the embodiment with the "unstable" icon (71) above. Finally, a third icon will present the parameters for those securities of interest that are being traded below their baseline value of yesterday, last week, etc., which provides an indication of the current trend of the performance of the financial security or financial securities markets.

The present invention is intended to be a user friendly system that may be specifically tailored to a particular monetary or financial market for the monitoring thereof and may be coordinated so as to utilize many of the particular analysts' own means of interpreting financial data. As such, it is recognized that there are many variations and changes that may be made with respect to the embodiments set forth above. It is to be understood that to the extent any such changes or alterations do not materially change or alter the method of data transformation and analysis as set forth herein, such changes or alterations must be considered as falling within the spirit and scope of the invention as recited by the claims that follow.

What is claimed is:

1. An apparatus for monitoring a financial securities market and generating an indicator for use in analyzing chances in the financial securities market comprising:

a. collection means for recording a plurality of security index values associated with the market on a computer-readable medium;

b. transformation means for transforming each value of the plurality of security index values associated with the market using a function dependent on at least baseline and critical values of the index value;

c. mapping means for mapping the function to a sequence of reference values and generating a plurality of deviation indicators, each security index value having one of the deviation indicators associated therewith; and d. analysis means for analyzing the deviation indicators and generating an average deviation indicator.

2. The apparatus as recited in claim 1 wherein the transformation means employs a function which exhibits a maximum sensitivity for deviations close to the baseline value of the security index value.

3. The apparatus as recited in claim 2 wherein the transformation means employs a function of the form:

$$y = \frac{1}{1 + e^{-G(x-BL)}}$$

-continued $$y = \tanh(x)$$

$$Y = \frac{X}{(1+X)}$$

$$y = ax + b\sin w \quad |x| > |bw|$$

$$y_m \quad x > x_{max}$$

wherein x represents the monetary value of a particular security index; BL represents the baseline monetary value for that security index; Xmax represents a predefined maximum monetary value for that security index; a, b, and w represent predefined numbers; and y represents the value of the function, and $Y_m$ represents a predefined maximum value of the function.

4. The apparatus as recited in claim 1 wherein the transformation means employs a function which exhibits a minimum sensitivity for deviations close to the baseline value of the security index value.

5. The apparatus as recited in claim 4 wherein the transformation means employs a function of the form:

$$y = \tfrac{1}{2}\{1 - \exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{min} - BL)^2} \text{ for } x < BL$$

and $$G_{high} = \frac{-\ln(1-2y'')}{(x_{max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

6. The apparatus as recited in claim 1 wherein the transformation means employs a sigmoid function.

7. The apparatus as recited in claim 1 wherein the mapping means comprises a means for determining the deviation indicators employing a function of the form:

$$DI = \lfloor K \times Abs(y - 0.5) \rfloor$$

wherein DI represents the deviation indicator, K represents a constant, Abs represents absolute, y represents the value of the function, and "⌊ ⌋" represents a floor function that returns the largest integer value of an expression contained between the "⌊" and the "⌋" symbols.

8. The apparatus as recited in claim 1 wherein the collection means comprises a plurality of sensors.

9. The apparatus as recited in claim 1 further comprising a display means for displaying the average security performance index.

10. An apparatus for monitoring a system and generating an indicator for use in analyzing changes in the system comprising:
  a. collection means for recording a plurality of security index values associated with the system on a computer-readable medium;
  b. transformation means for transforming each value of the plurality of security index values associated with the system using a function dependent on at least baseline and critical values of the security index value;
  c. mapping means for mapping the function to a sequence of reference values and generating a plurality of deviation indicators, each index value having one of the deviation indicators associated therewith; and
  d. analysis means for analyzing the deviation indicators and generating a system criticality indicator.

11. The apparatus as recited in claim 10 wherein the transformation means employs a function which exhibits a maximum sensitivity for deviations close to the baseline value of the index value.

12. The apparatus as recited in claim 11 wherein the transformation means employs a function of the form:

$$y = \frac{1}{1 + e^{-G(x-BL)}}$$

$$y = \tanh(x)$$

$$Y = \frac{X}{(1+X)}$$

$$y = ax + b\sin w \quad |x| > |bw|$$

$$y_m \quad x > x_{max}$$

wherein x represents the monetary value of the particular security index; BL represents the baseline monetary value for the securities index; $x_{max}$ represents a predefined maximum value for the security index; a, b, and w represent predefined numbers; and y represents the value of the function, and $Y_m$ represents a predefined maximum value of the function.

13. The apparatus as recited in claim 10 wherein the transformation means employs a function which exhibits a minimum sensitivity for deviations close to the baseline value of the security index value.

14. The apparatus as recited in claim 13 wherein the transformation means employs a function of the form:

$$y = \tfrac{1}{2}\{1 - \exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{min} - BL)^2} \text{ for } x < BL$$

and $$G_{high} = \frac{-\ln(1-2y'')}{(x_{max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

15. The apparatus as recited in claim 10 wherein the transformation means employs a sigmoid function.

16. The apparatus as recited in claim 10 wherein the mapping means comprises a means for determining the deviation indicators employing a function of the form:

$$DI = \lfloor K \times Abs(y - 0.5) \rfloor$$

wherein DI represents the deviation indicator, K represents a constant, Abs represents absolute, y represents the value of the function, and "⌊ ⌋" represents a floor function that returns the largest integer value of an expression contained between the "⌊" and the "⌋" symbols.

17. The apparatus as recited in claim 10 wherein the collection means comprises a plurality of sensors.

18. The apparatus as recited in claim 10 further comprising a display means for displaying the system criticality indicator.

19. An apparatus for monitoring a system and generating an indicator for use in analyzing changes in the system comprising:
   a. collection means for recording a plurality of indices associated with the system on a computer-readable medium;
   b. transformation means for transforming each value of the plurality of indices associated with the system using a function dependent on at least baseline and critical values of the security index value, wherein the function exhibits a maximum sensitivity for deviations close to the baseline value of the index value; and
   c. mapping means for mapping the function to a sequence of reference values and generating a deviation indicator for each security index value.

20. The apparatus as recited in claim 19 wherein the transformation means employs a function of the form:

$$y = \frac{1}{1 + e^{-G(x-BL)}}$$

$$y = \tanh(x)$$

$$Y = \frac{X}{(1+X)}$$

$$y = ax + b\sin w \quad |x| > |bw|$$

$$y_m \quad x > x_{max}$$

wherein x represents the monetary value of the particular security index; BL represents the baseline monetary value for the securities index; $X_{max}$ represents a predefined maximum value for the security index; a, b, and w represent predefined numbers; and y represents the value of the function, and $Y_m$ represents a predefined maximum value of the function.

21. The apparatus as recited in claim 19 wherein the transformation means employs a function which exhibits a minimum sensitivity for deviations close to the baseline value of the security index value.

22. The apparatus as recited in claim 21 wherein the transformation means employs a function of the form:

$$y = \tfrac{1}{2}\{1 - \exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1 - 2y')}{(x_{min} - BL)^2} \quad \text{for } x < BL$$

and $$G_{high} = \frac{-\ln(1 - 2y'')}{(x_{max} - BL)^2} \quad \text{for } x \geq BL,$$

wherein y' represents the value of the function at $x_{min}$, $x_{min}$ represents the minimum value of the parameter, y'' represents the value of the function at $x_{max}$ and $x_{max}$ represents the maximum value of the parameter.

23. The apparatus as recited in claim 19 wherein the mapping means comprises a means for determining the deviation indicators employing a function of the form:

$$DI = \lfloor K \times Abs(y - 0.5) \rfloor$$

wherein DI represents the deviation indicator, K represents a constant, Abs represents absolute, y represents the value of the function, and "$\lfloor \ \rfloor$" represents a floor function that returns the largest integer value of an expression contained between the "$\lfloor$" and the "$\rfloor$" symbols.

24. The apparatus as recited in claim 19 wherein the collection means comprises a plurality of sensors.

25. The apparatus as recited in claim 19 further comprising a display means for displaying the average deviation indicator.

26. An apparatus for monitoring a financial security and generating an indicator for use in analyzing changes in the financial security comprising:
   a. collection means for recording a plurality of security index values associated with the financial security on a computer-readable medium,
   b. transformation means for transforming each value of the plurality of security index values associated with the financial security using a function dependent on at least baseline and critical values of the financial security;
   c. mapping means for mapping the function to a sequence of reference values and generating a plurality of deviation indicators, each security index value having one of the deviation indicators associated therewith; and
   d. analysis means for analyzing the deviation indicators and generating an average deviation indicator.

27. An apparatus for monitoring a financial security and generating an indicator for use in analyzing changes in the financial security comprising:
   a. collection means for recording a plurality of security index values associated with the financial security on a computer-readable medium;
   b. transformation means for transforming each value of the plurality of security index values associated with the financial security using a function dependent on at least baseline and critical values of the index value;
   c. mapping means for mapping the function to a sequence of reference values and generating a plurality of deviation indicators, each security index value having one of the deviation indicators associated therewith; and
   d. analysis means for analyzing the deviation indicators and generating a system criticality indicator.

28. An apparatus for monitoring a financial security and generating an indicator for use in analyzing changes in the financial security comprising:
   a. collection means for recording a plurality of security index values associated with the financial security on a computer-readable medium;
   b. transformation means for transforming each value of the plurality of security index values associated with the financial security using a function dependent on at least baseline and critical values of the security index value, wherein the function exhibits a maximum sensitivity for deviations close to the baseline value of the index value; and
   c. mapping means for mapping the function to a sequence of reference values and generating a deviation indicator for each security index value.

29. A method for monitoring a financial securities market and generating an indicator for use in analyzing changes in the financial securities market comprising:
   a. a collection step for recording a plurality of security index values associated with the market on a computer-readable medium;

b. a transformation step for transforming each value of the security index values using a function dependent on at least baseline and critical values of the index value;

c. a mapping step for mapping the function to a sequence of reference values and generating a plurality of deviation indicators, each security index value having one of the deviation indicators associated therewith; and d. an analysis step for analyzing the deviation indicators and generating an average deviation indicator.

30. The method as recited in claim 29 wherein the transformation step employs a function which exhibits a maximum sensitivity for deviations close to the baseline value of the security index value.

31. The method as recited in claim 30 wherein the transformation step employs a function of the form:

$$y = \frac{1}{1 + e^{-G(x-BL)}}$$
$$y = \tanh(x)$$
$$Y = \frac{X}{(1+X)}$$
$$y = ax + b\sin w \quad |x| > |bw|$$
$$y_m \quad x > x_{\max}$$

wherein x represents the monetary value of the particular security index; BL represents the baseline monetary value for the securities index; $x_{max}$, represents a predefined maximum value for the security index; a, b, and w represents predefined numbers; and y represents the value of the function, and $Y_m$ represents a predefined maximum value of the function.

32. The method as recited in claim 29 wherein the transformation step employs a function which exhibits a minimum sensitivity for deviations close to the baseline value of the security index value.

33. The method as recited in claim 32 wherein the transformation step employs a function of the form:

$$y = \tfrac{1}{2}\{1-\exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{\min} - BL)^2} \text{ for } x < BL$$

and $$G_{high} = \frac{-\ln(1-2y'')}{(x_{\max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$, represents the maximum value of the parameter.

34. The method as recited in claim 29 wherein the transformation step employs a sigmoid function.

35. The method as recited in claim 29 wherein the mapping step comprises the step of determining the deviation indicators employing a function of the form:

$$DI = \lfloor K \times Abs(y-0.5) \rfloor$$

wherein DI represents the deviation indicator, K represents a constant, Abs represents absolute, y represents the value of the function, and "⌊ ⌋" represents a floor function that returns the largest integer value of an expression contained between the "⌊" and the "⌋" symbols.

36. The method as recited in claim 29 further comprising a step of displaying the average deviation indicator.

37. The method as recited in claim 29 wherein the analysis step comprises the steps of:

a. defining at least one subsystem; and b. generating an average deviation indicator for each subsystem.

38. A method for monitoring a financial securities market and generating an indicator for use in analyzing changes in the financial securities market comprising:

a. a collection step for collecting a plurality of security index values associated with the market on a computer-readable medium;

b. a transformation step for transforming each value of the security index values using a function dependent on at least baseline and critical values of the index value;

c. a mapping step for mapping the function to a sequence of reference values and generating a plurality of deviation indicators, each security index value having one of the deviation indicators associated therewith; and d. an analysis step for analyzing the deviation indicators and generating a criticality indicator.

39. The method as recited in claim 38 wherein the transformation step employs a function which exhibits a maximum sensitivity for deviations close to the baseline value of the security index value.

40. The method as recited in claim 39 wherein the transformation step employs a function of the form:

$$y = \frac{1}{1 + e^{-G(x-BL)}}$$
$$y = \tanh(x)$$
$$Y = \frac{X}{(1+X)}$$
$$y = ax + b\sin w \quad |x| > |bw|$$
$$y_m \quad x > x_{\max}$$

wherein x represents the monetary value of the particular security index; BL represents the baseline monetary value for the securities index; $x_{max}$ represents a predefined maximum value for the security index; a, b, and w represents predefined numbers; and y represents the value of the function, and $y_m$ represents a predefined maximum value of the function.

41. The method as recited in claim 38 wherein the transformation step employs a function which exhibits a minimum sensitivity for deviations close to the baseline value of the security index value.

42. The method as recited in claim 41 wherein the transformation step employs a function of the form:

$$y = \tfrac{1}{2}\{1-\exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{\min} - BL)^2} \text{ for } x < BL$$

and $$G_{high} = \frac{-\ln(1-2y'')}{(x_{max}-BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

43. The method as recited in claim 38 wherein the transformation step employs a sigmoid function.

44. The method as recited in claim 38 wherein the mapping step comprises a step of determining the deviation indicators employing a function of the form:

$$DI=\lfloor K \times Abs(y-0.5) \rfloor$$

wherein DI represents the deviation indicator, K represents a constant, Abs represents absolute, y represents the value of the function, and "⌊ ⌋" represents a floor function that returns the largest integer value of an expression contained between the "⌊" and the "⌋" symbols.

45. The method as recited in claim 38 further comprising a step of displaying the system criticality indicator.

46. The method as recited in claim 38 wherein the analysis step comprises the steps of:
   a. defining at least one subsystem; and
   b. generating a criticality indicator for each subsystem.

47. A method for monitoring a financial securities market and generating an indicator for use in analyzing changes in the financial securities market comprising:
   a. a collection step for recording a plurality of security index values associated with the market on a computer-readable medium;
   b. a transformation step for transforming each value of the security index values using a function dependent on at least baseline and critical values of the index value, wherein the function exhibits a maximum sensitivity for deviations close to the baseline value of the index value; and
   c. a mapping step for mapping the function to a sequence of reference values and generating a deviation indicator for each security index value.

48. The method as recited in claim 47 wherein the transformation step employs a function of the form:

$$y = \frac{1}{1+e^{-G(x-BL)}}$$
$$y = \tanh(x)$$
$$Y = \frac{X}{(1+X)}$$
$$y = ax + b\sin w \quad |x| > |bw|$$
$$y_m \quad x > x_{max}$$

wherein x represents the monetary value of the particular security index; BL represents the baseline monetary value for the securities index; $x_{max}$ represents a predefined maximum value for the security index; a, b, and w represents predefined numbers; and y represents the value of the function, and $y_m$ represents a predefined maximum value of the function.

49. The method as recited in claim 47 wherein the mapping step comprises a step of determining the deviation indicators employing a function of the form:

$$DI=\lfloor K \times Abs(y-0.5) \rfloor$$

wherein DI represents the deviation indicator, K represents a constant, Abs represents absolute, y represents the value of the function, and "⌊ ⌋" represents a floor function that returns the largest integer value of an expression contained between the "⌊" and the "⌋" symbols.

50. The method as recited in claim 47 further comprising a step of displaying the average deviation indicator.

51. A method for monitoring a financial security and generating an indicator for use in analyzing changes in the financial security comprising:
   a. a collection step for recording a plurality of security index values associated with the financial security on a computer-readable medium;
   b. a transformation step for transforming each value of the security index values using a function dependent on at least baseline and critical values of the index value;
   c. a mapping step for mapping the function to a sequence of reference values and generating a plurality of deviation indicators, each security index value having one of the deviation indicators associated therewith; and
   d. an analysis step for analyzing the deviation indicators and generating an average deviation indicator.

52. A method for monitoring a financial security and generating an indicator for use in analyzing changes in the financial security comprising:
   a. a collection step for recording a plurality of security index values associated with the financial security on a computer-readable medium;
   b. a transformation step for transforming each value of the security index values using a function dependent on at least baseline and critical values of the index value;
   c. a mapping step for mapping the function to a sequence of reference values and generating a plurality of deviation indicators, each security index value having one of the deviation indicators associated therewith; and
   d. an analysis step for analyzing the deviation indicators and generating a system criticality indicator.

53. A method for monitoring a financial security and generating an indicator for use in analyzing chances in the financial security comprising:
   a. a collection step for recording a plurality of security index values associated with the financial security on a computer-readable medium;
   b. a transformation step for transforming each value of the security index values using a function dependent on at least baseline and critical values of the index value, wherein the function exhibits a maximum sensitivity for values of the index value near the baseline value of the index value; and
   c. a mapping step for mapping the function to a sequence of reference values and generating a deviation indicator for each security index value.

54. A method for monitoring financial securities markets and generating an indicator for use in analyzing chances in the financial securities market comprising the steps of:
   a. recording a plurality of security index values on a computer-readable medium;
   b. transforming each index value to a sigmoid function indicative of at least normal and critical levels of the index value;
   c. comparing each of the computed sigmoid function to a prescribed sequence of reference values and on the basis of this comparison generating for each index value a corresponding status value indicative of the upper and lower limits of the securities worth;

d. selecting either the upper or lower status value as a signal depending upon whether the security is to be bought or sold; and e. displaying said status value.

55. The method of claim 54 wherein each security index value is transformed using a sigmoid function in accordance with pre-selected maximum and minimum values and a preselected baseline value adapted to the financial security being monitored.

56. The method of claim 54 wherein said critical levels of said index value comprise the highest and lowest monetary values of the financial security over a given period of time.

57. The method of claim 56 wherein said highest and lowest monetary values of the financial security are determined over a predetermined short time span and over a predetermined long time span.

58. The method of claim 57 wherein said transformation of the security index value employs any equation selected from the group consisting of:

$$y = \frac{1}{1 + e^{-G(x-BL)}}$$

$$y = \tanh(x)$$

$$y = \frac{x}{(1+x)}$$

$$y = ax + b\sin w \quad |x| > |bw|$$

$$y_m \quad x > x_{max}$$

wherein x represents the monetary value of a particular security index; BL represents the baseline monetary value for that security index; Xmax represents a predefined maximum monetary value for that security index; a, b, and w represent pre-defined number; and y represents the value of the function, and $Y_m$ represents a predefined maximum value of the function.

59. The method of claim 58 wherein said security is a stock issue traded on the New York Stock Exchange.

60. The method of claim 59 wherein said security index value is a stock market indicator selected from the group consisting of dividends, yield, profit/earnings ratio, sales volume, high selling price, low selling price, closing price, high and low values for a one-year period and percent change.

61. The method of claim 59 wherein said security is a stock issue traded on NASDAQ National Market.

62. The method of claim 61 wherein said security index is selected from the group consisting of dividend value, sales volume, closing price/share and net change.

63. The method of claim 61 wherein said security is a mutual fund.

64. The method of claim 63 wherein said security index value is selected from the group consisting of expense ratio, net asset value, share price and the change in the mutual funds net asset value from the previous day.

65. The method of claim 57 wherein said transformation of the security index value employs a function of the form:

$$y = \frac{1}{2}\{1 - \exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{min} - BL)^2} \text{ for } x < BL$$

and $$G_{high} = \frac{-\ln(1-2y'')}{(x_{max} - BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

66. A financial securities monitoring system for generating an indicator for use in analyzing changes in a securities market, comprising:

a. at least one financial monitor operative to collect a plurality of financial parameters of a securities market, each said financial parameter having a pre-defined baselines and to record the plurality of financial parameters on a computer-readable medium;

b. means for transforming each financial parameter to a function indicative of at least normal and critical levels of the parameter;

c. means for comparing each of said functions to a prescribed sequence of reference values and on the basis of the comparison generating for each parameter a corresponding critical value level;

d. means for selecting one of said critical value levels as a monetary status indicator; and e. means for displaying said monetary status indicator; wherein said means for transforming employs a member of the following group:

$$y = \frac{1}{1 + e^{-G(x-BL)}}$$

$$y = \tanh(x)$$

$$y = \frac{x}{(1+x)}$$

$$y = ax + b\sin w \quad |x| > |bw|$$

$$y_m \quad x > x_{max}$$

wherein x represents the monetary value of the particular security index; BL represents the baseline monetary value for the securities index; $x_{max}$ represents a predefined maximum value for the security index; a, b, and w represent predefined numbers; and y represents the value of the function, and $y_m$ represents a predefined maximum value of the function.

67. The system of claim 66 comprising means for selecting a maximum value of said critical value levels as said monetary status indicator.

68. The system of claim 67 comprising means for selecting a maximum value of said critical value levels as said indicator.

69. The system of claim 68 comprising means for simultaneously displaying a history of said monetary status indicator over a predefined short time span and over a predefined long time span.

70. The system of claim 69 comprising means for selecting a maximum value of said critical value levels as said monetary status indicator.

71. The system of claim 70 comprising means for simultaneously displaying a history of said monetary status indicator over a predefined short time span and over a predefined long time span.

72. A financial securities monitoring system for generating an indicator for use in analyzing chances in a securities market, comprising:
   a. at least one financial monitor operative to collect a plurality of financial parameters of a securities market, each said financial parameter having a pre-defined baseline, and to record the plurality of financial parameters on a computer-readable medium;
   b. means for transforming each financial parameter to a function indicative of at least normal and critical levels of the parameter;
   c. means for comparing each of said functions to a prescribed sequence of reference values and on the basis of the comparison generating for each parameter a corresponding critical value level;
   d. means for selecting one of said critical value levels as a monetary status indicator; and
   e. means for displaying said monetary status indicator; wherein said means for transforming employs a function of the form:

$$y=\frac{1}{2}\{1-\exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{min}-BL)^2} \text{ for } x < BL$$

and $$G_{high} = \frac{-\ln(1-2y'')}{(x_{max}-BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

73. A financial securities monitoring system for generating an indicator for use in analyzing chances in a security comprising:
   a. at least one financial monitor, each monitor including means for collecting a financial parameter indicative of the status of the security being monitored, each financial parameter having a baseline value, and to record the financial parameter on a computer-readable medium;
   b. a computer operatively coupled to said financial monitor, said computer being programmed to determine for each financial parameter a corresponding critical value and to select one of said critical value levels as a monetary status critical value indicator; wherein, in determining said levels, each financial parameter is transformed to a function defined by pre-selected maximum and minimum parameter values and a pre-selected baseline value, said function exhibiting a maximum sensitivity for parameter values near said baseline; and
   c. means for simultaneously displaying a history of said monetary status indicator over a predefined short time span and over a predefined long time span; wherein said computer is programmed to transform said financial parameters by employing a member of the following group:

$$y = \frac{1}{1+e^{-G(x-BL)}}$$

$$y = \tanh(x)$$

$$y = \frac{x}{(1+x)}$$

$$y = ax + b\sin w \quad |x| > |bw|$$

$$y_m \quad x > x_{max}$$

wherein x represents the measured value of the financial parameter; BL represents the baseline value for the financial parameter; $x_{max}$ represents a predefined maximum value of the financial parameter; a, b, and w represent predefined numbers; and represents the value of the function, and $y_m$ represents a predefined maximum value of the function.

74. The system of claim 73 wherein said computer is programmed to transform each financial parameter to a sigmoid function and to assign a critical value level to each parameter by comparing the respective values of the sigmoid functions to a prescribed set of reference values and assigning said critical value levels on the basis of the comparison.

75. A financial securities monitoring system for generating an indicator for use in analyzing changes in a financial securities market comprising:
   a. at least one financial monitor, each monitor including means for collecting a financial parameter indicative of the status of the security being monitored, each financial parameter having a baseline value, and to record the financial parameter on a computer-readable medium;
   b. a computer operatively coupled to said financial monitor, said computer being programmed to determine for each financial parameter a corresponding critical value and to select one of said critical value levels as a monetary status critical value indicator; wherein, in determining said levels, each financial parameter is transformed to a function defined by pre-selected maximum and minimum parameter values and a pre-selected baseline value, said function exhibiting a minimum sensitivity for parameter values near said baseline; and
   c. means for simultaneously displaying a history of said monetary status indicator over a predefined short time span and over a predefined long time span; wherein said computer is programmed to transform said financial parameters by employing a function of the form:

$$y=\frac{1}{2}\{1-\exp(-G(x-BL)^2)\},$$

wherein y represents the value of the function, x represents the measured value of the parameter, BL represents the baseline value for the parameter, and G represents a mapping parameter such that $$G_{low} = \frac{-\ln(1-2y')}{(x_{min}-BL)^2} \text{ for } x < BL$$

and $$G_{high} = \frac{-\ln(1-2y'')}{(x_{max}-BL)^2} \text{ for } x \geq BL,$$

wherein y' represents the value of the function at $x_{min}$, $x_{min}$ represents the minimum value of the parameter, y" represents the value of the function at $x_{max}$, and $x_{max}$ represents the maximum value of the parameter.

76. The system of claim 75 wherein said critical value levels are assigned in accordance with the following variants:
- 0—(color of display background) No deviation from baseline
- 1—(white-yellow) Little movement from baseline
- 2—(yellow) Some deviation from baseline
- 3—(yellow-orange) Greater deviation from baseline
- 4—(orange) Considerable deviation from baseline
- 5—(red) Maximum deviation from baseline.

* * * * *